(12) United States Patent
Williams

(10) Patent No.: US 10,113,643 B2
(45) Date of Patent: Oct. 30, 2018

(54) COMPRESSION PISTON RING FOR AN INTERNAL COMBUSTION ENGINE

(71) Applicant: Ford Global Technologies, LLC, Dearborn, MI (US)

(72) Inventor: Rickey L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 622 days.

(21) Appl. No.: 14/217,984

(22) Filed: Mar. 18, 2014

(65) Prior Publication Data
US 2015/0267813 A1    Sep. 24, 2015

(51) Int. Cl.
| | |
|---|---|
| *F16J 9/20* | (2006.01) |
| *F02F 3/00* | (2006.01) |
| *B23P 15/08* | (2006.01) |
| *F16J 9/12* | (2006.01) |

(52) U.S. Cl.
CPC ............... *F16J 9/20* (2013.01); *B23P 15/08* (2013.01); *F02F 3/00* (2013.01); *F16J 9/12* (2013.01); *Y10T 29/49274* (2015.01)

(58) Field of Classification Search
CPC ........ F16J 9/20; F16J 9/12; F16J 9/203; F02F 5/00; B23P 15/08; B23P 15/06
USPC ......... 123/193.6, 197.2; 29/888.049, 888.07; 277/434, 436, 438, 458, 459, 460, 465
See application file for complete search history.

(56) References Cited

U.S. PATENT DOCUMENTS

| | | | | |
|---|---|---|---|---|
| 1,945,763 A | * | 2/1934 | Winstead | 277/461 |
| 2,554,289 A | * | 5/1951 | Anderson | 277/444 |
| 2,657,962 A | * | 11/1953 | Robinson | 277/463 |
| 3,066,943 A | | 12/1962 | Brenneke | |
| 3,174,762 A | * | 3/1965 | Hesling | F16J 9/00 277/444 |
| 3,573,874 A | * | 4/1971 | Hill | F16J 9/26 277/444 |

(Continued)

FOREIGN PATENT DOCUMENTS

| | | | |
|---|---|---|---|
| DE | 102009036240 B4 | * 11/2014 | |
| JP | 56027050 A | * 3/1981 | F02F 5/00 |

OTHER PUBLICATIONS http://www.ringleader.net/about-piston-rings/2/index.phtml, "Running Face Profiles", Precision Products, Feb. 26, 2014, 2 pages.

(Continued)

*Primary Examiner* — Grant Moubry

(74) *Attorney, Agent, or Firm* — Brooks Kushman P.C.; Julia Voutyras

(57) ABSTRACT

A compression ring for an engine piston includes an upper and lower face, and an inner face positioned between the upper and lower faces along an inner diameter of the ring. An outer face is positioned between the upper and lower faces along an outer diameter of the ring and is formed by a continuous curve along the axial direction of the ring. The continuous curve has first and second convex surfaces connected by a concave surface with each convex surface defined by first and second radii, respectively. A method of forming a piston compression ring includes machining an outer face of the ring to form a continuous curve along an axial direction of the ring, where the continuous curve has a first convex section and a second convex section connected by an intermediate section.

19 Claims, 2 Drawing Sheets

(56) References Cited

U.S. PATENT DOCUMENTS

| | | | |
|---|---|---|---|
| 3,806,137 A * | 4/1974 | Prasse et al. | 277/468 |
| 4,210,338 A | 7/1980 | Collings, Jr. | |
| 4,235,447 A * | 11/1980 | Davison, Jr. | 277/462 |
| 4,759,555 A * | 7/1988 | Hailing | F16J 9/18 |
| | | | 277/631 |
| 5,450,783 A * | 9/1995 | Binford | 92/208 |
| 7,429,047 B1 | 9/2008 | Wilkinson | |
| 8,353,267 B2 * | 1/2013 | Cha et al. | 123/193.6 |
| 8,739,753 B2 * | 6/2014 | Higuchi | F16J 9/20 |
| | | | 123/193.6 |
| 2008/0017162 A1 | 1/2008 | Clever | |
| 2010/0090416 A1 | 4/2010 | Tomanik et al. | |
| 2011/0204575 A1 | 8/2011 | Langner et al. | |
| 2011/0309586 A1 * | 12/2011 | Esser | 277/442 |

OTHER PUBLICATIONS www.hastingsmfg.com, "Popular Piston Ring Types", Hasting Piston Rings, Feb. 26, 2014, 1 pages.

Smedley, "Piston Ring Design for Reduced Friction in Modern Internal Combustion Engines", Mechanical Engineering, McGill University, May 7, 2004, p. 56.

\* cited by examiner

COMPRESSION PISTON RING FOR AN INTERNAL COMBUSTION ENGINE

TECHNICAL FIELD

Various embodiments relate to a compression piston ring for an internal combustion engine.

BACKGROUND

Piston assemblies of internal combustion engines have a piston with annular grooves and sealing elements contained within each groove. One of the sealing elements may be a split compression ring. The axial width of the compression ring and associated groove may be reduced to reduce contact areas between the compression ring and a cylinder bore side wall, thereby reducing friction between the two surfaces. The dimensions of the compression ring and groove may be limited based on manufacturability and other factors, thereby limiting the reduction in friction.

SUMMARY

In an embodiment, a compression ring for an engine piston is provided with an upper and lower face. An inner face is positioned between the upper and lower faces along an inner diameter of the ring. An outer face is positioned between the upper and lower faces along an outer diameter of the ring. The outer face is formed by a continuous curve along the axial direction of the ring. The continuous curve has first and second convex surfaces connected by a concave surface, each convex surface defined by first and second radii, respectively.

In another embodiment, a piston assembly for an internal combustion engine is provided with a piston having a crown and a side wall. The side wall forms an annular groove. A compression ring is sized to be received within the groove. The compression ring has an outer face formed by a continuous curve. The outer face has first and second convex surfaces connected by a concave surface with each convex surface defined by a first and second radius of curvature, respectively.

In yet another embodiment, a method of forming a compression ring includes providing a ring having an outer face, an inner face, an upper face and a lower face. The outer face of the ring is machined to form a continuous curve along an axial direction of the ring. The continuous curve has a first convex section and a second convex section connected by a concave section, with each convex section defined by first and second radii, respectively.

Various embodiments of the present disclosure have associated, non-limiting advantages. For example, by providing a top compression ring with a pair of convex surfaces the effective surface area in contact with a cylinder wall of an engine is reduced compared to a ring with a single convex surface, thereby reducing friction.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
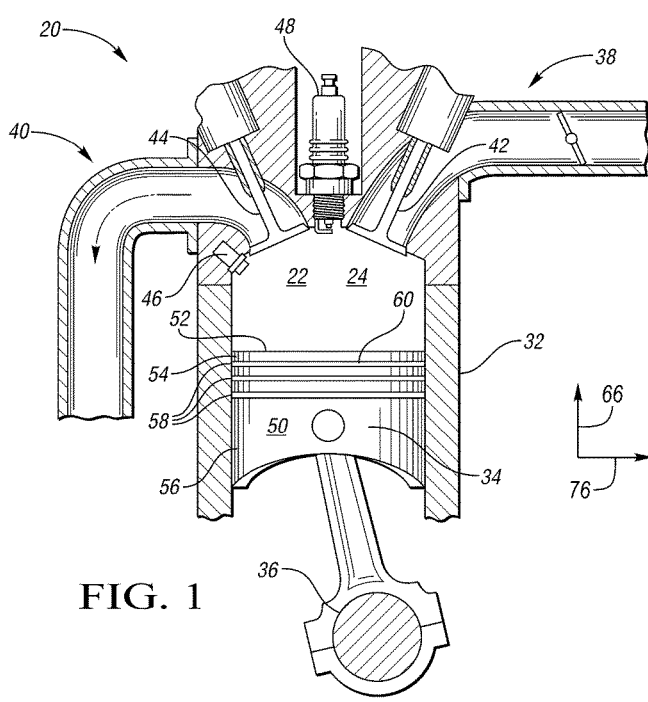
FIG. 1 is a schematic of an internal combustion engine according to an embodiment.

FIG. 1 illustrates a schematic of an internal combustion engine 20. The engine 20 has a plurality of cylinders 22, and one cylinder is illustrated. The engine 20 has a combustion chamber 24 associated with each cylinder 22. The cylinder 22 is formed by cylinder walls 32 and piston assembly 34. The piston assembly 34 is connected to a crankshaft 36. The combustion chamber 24 is in fluid communication with the intake manifold 38 and the exhaust manifold 40. An intake valve 42 controls flow from the intake manifold 38 into the combustion chamber 30. An exhaust valve 44 controls flow from the combustion chamber 30 to the exhaust manifold 40. The intake and exhaust valves 42, 44 may be operated in various ways as is known in the art to control the engine operation.

A fuel injector 46 delivers fuel from a fuel system directly into the combustion chamber 30 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 30. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 operates under a four-stroke cycle including an intake stroke, a compression stroke, an ignition stroke, and an exhaust stroke. In other examples, the engine may operate using a two-stroke cycle. During the intake stroke, the intake valve 42 opens and the exhaust valve 44 closes while the piston assembly 34 moves from the top of the cylinder 22 to the bottom of the cylinder 22 to introduce air from the intake manifold to the combustion chamber. The piston assembly 34 position at the top of the cylinder 22 is generally known as top dead center (TDC). The piston assembly 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston assembly 34 causes a corresponding movement in crankshaft 36 and provides for a mechanical torque output from the engine 20.

During the exhaust stroke, the intake valve 42 remains closed, and the exhaust valve 44 opens. The piston assembly 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The piston assembly 34 has a piston 50 with a crown 52, a side wall 54 and skirts 56. The piston 50 contains structure to connect the piston to the crankshaft 36 via a connecting rod pin, or the like. The side wall 54 forms a cylinder and defines a plurality of annular grooves 58. Three annular grooves are illustrated in FIG. 1; however, any number of annular grooves may be used with the piston assembly 34. In one embodiment, the annular grooves 58 are aligned with a plane defined by the piston crown 52. The annular grooves 58 are spaced apart axially. The top groove 60 contains a top compression ring or sealing element and is adjacent to the crown 52. The other grooves contain sealing elements such as compression rings or scraper rings. The sealing elements, including the compression rings and scraper rings, interact with the bore of the cylinder wall 32 as the piston assembly moves within the cylinder 22. Liquid and solid lubricants, such as oil, act to reduce friction as the piston assembly 34 moves within the cylinder 22 as well as prevent combustion gases from exiting the combustion chamber 24, for example, by blow by.

In order to reduce friction between the top compression ring and the cylinder wall, it may be desirable to reduce the overall axial width, thereby reducing the contact surface area between the compression ring and the cylinder wall. Presently, friction between the top compression ring and the cylinder wall is reduced by reducing the axial width of the top compression ring. The grooves, such as the top groove 60, may be limited in size to a minimum width based on machining and manufacturing restraints. This in turn limits the size of not only the groove 60, but also the top compression seal contained within the groove. The top compression ring may be substantially the axial width of the groove 60 to reduce deflection of the ring, blow by, etc. For example, due to manufacturing constraints, including the top compression ring width and groove width, the minimum axial width may be approximately one millimeter or 1.0 mm.

Figure 2:
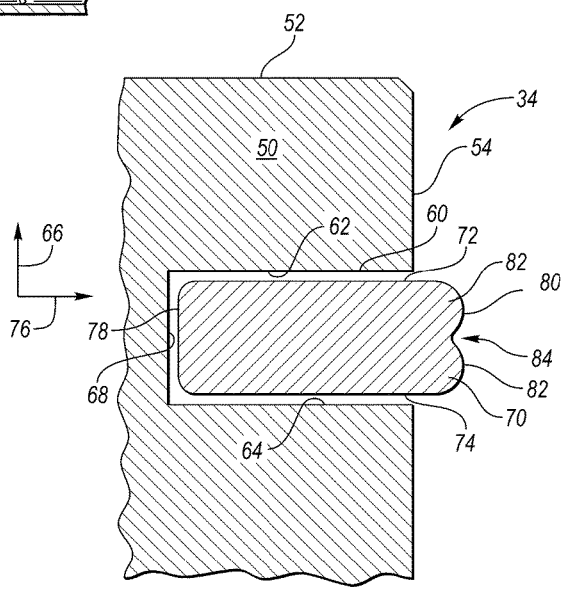
FIG. 2 is a partial sectional view of a piston and a compression ring according to an embodiment.

FIG. 2 illustrates a partial sectional view of the piston assembly 34. The top groove 60 is illustrated as being adjacent to, or the closest groove to, to the crown 52. The groove is formed by machining the side wall 54 of the piston 50. The groove 60 has upper and lower surfaces 62, 64 that are axially spaced apart along a longitudinal axis 66. An inner wall 68 connects the upper and lower surfaces 62, 64 and extends circumferentially about the piston 50 and is inset from the side wall 54 surface.

Figure 3:
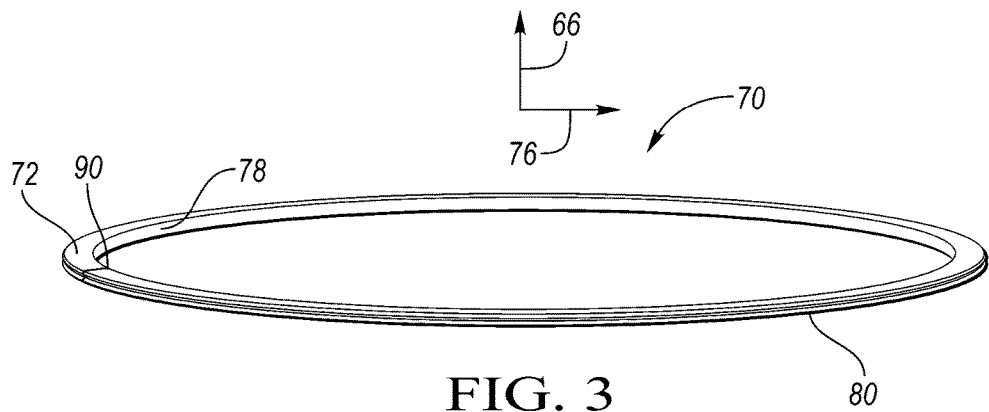
FIG. 3 is a perspective view of the compression ring of FIG. 2.
Figure 4:
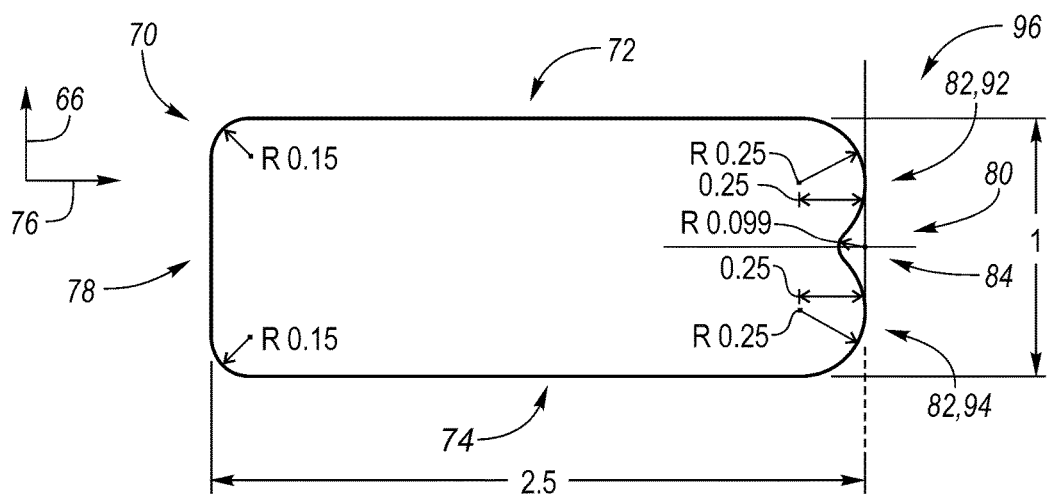
FIG. 4 is a schematic view of the compression ring of FIG. 2.

The groove 60 contains a top compression ring 70. Additional views of the top compression ring 70 are illustrated in FIGS. 3-4. The top compression ring 70 may be a split ring and may be manufactured from a metal or another suitable material. The top compression ring 70 may be a unitary structure formed and/or machined from a single piece of stock material.

The top compression ring 70 has an upper face 72 and a lower face 74 that are axially spaced apart from one another. The upper face 72 is adjacent to the upper surface 62. The lower face is adjacent to the lower surface 64. The upper face 72 and lower face 74 extend in a plane generally parallel to the crown 52 and outward along a radial axis 76. An inner face 78 is positioned between the upper and lower faces and is adjacent to the inner wall 68.

The top compression ring 70 has an outer face 80. At least a portion of the outer face 80 extends past and protrudes from the side wall 54 of the piston 50. The outer face 80 is configured to contact the bore of the cylinder, and translates with respect to the cylinder as the piston moves. The outer face 80 forms a contact area with the cylinder where the two surfaces contact one another.

The outer face 80 has two protrusions, or convex surfaces, 82 that provide for reduced overall contact area with the cylinder while maintaining the ring 70 at or above the minimum width proscribed by manufacturing limits, etc. Each convex surface 82 is formed by a radius and includes an arc of a circle. Each convex surface 82 is adjacent to an upper or lower face 72, 74 of the ring 70. An intermediate section, such as a groove 84 or concave surface, is formed between the convex surfaces 82. By reducing the overall or effective contact area of the ring 70 with the cylinder, the overall friction is also reduced.

According to one example, the ring 70 has approximately 50% reduction in contact area with the cylinder bore compared to a conventional top compression ring with a single convex protrusion, thereby reducing frictional forces. The frictional force may be reduced by approximately 50% based on a normal contact pressure. This reduction in frictional forces provides approximately a 0.15% improvement in fuel economy for the engine.

Additionally, the profile of the outer face 80 provides for improved sealing. For example, the sealing may be improved bottom dead center and top dead center due to piston rockover angle, or tilt.

FIG. 3 is a perspective view showing the split 90 of the split compression ring. The inner face 78 lies along the inner diameter of the ring 70. The outer face 80 lies along the outer diameter of the ring 70.

FIG. 4 is a schematic view of the compression ring 70 illustrating dimensions of the ring in millimeters according to one example. The profile of the cross section of the ring 70 includes the inner face 78, the upper face 72, the lower face 74, and the outer face 80. The axial width of the ring in the longitudinal axis 66 is shown as one millimeter. The radial width of the ring along the radial axis 76 is 2.5 millimeters. Each of the convex surfaces 82 has a radius of curvature of 0.25 millimeters, and includes an arc of a circle. A tangent line of a point on the upper convex surface 92 is aligned with the upper face 72 such that it overlies the upper face 72. A tangent line of a point on the lower convex surface 94 is aligned with the lower face 74 such that it overlies the lower face 74. The radii of the upper and lower convex surfaces 92, 94 may be equal to one another as shown.

A groove or concave surface 84 is formed between the two convex surfaces. The concave surface may have a radius of curvature of 0.01 millimeters or 0.099 millimeters. The radius of curvature of the concave surface 84 is shown as being 0.099 mm. The radius of curvature of the concave surface 84 is less than the radius of curvature of the upper convex surface 92 and/or the radius of curvature of the lower convex surface 94.

The outer face 80 forms a smooth curve or profile 96, as seen in FIG. 4. In one example, the upper convex surface is blended with the concave surface and the lower convex surface is blended with the concave surface to provide a smooth, continuous profile 96. The profile 96 has no discontinuities such as jumps or the like, and the profile 96 may also be nonsegmented. The profile 96 is smooth such that at least the first derivative of the profile function is continuous and/or smooth. The profile 96 may also have a second derivative that is continuous and/or smooth. In some examples, the profile 96 is continuously differentiable. Additionally, the curves 92, 94, 84 touch at their joining points. In the example shown, the curves 92, 94, and 84 also share common tangent lines or directions at joining points between the curves. For example, curve 92 and curve 84 have a common tangent line at their joining point, and likewise for curves 94 and 84.

Various embodiments of the present disclosure have associated, non-limiting advantages. For example, by providing a top compression ring with a pair of convex surfaces on the outer ring face, the effective surface area in contact with a cylinder wall of an engine is reduced compared to a ring with a single convex surface, thereby reducing friction and increasing fuel economy. Additionally, the outer ring face provides for improved sealing of the cylinder at top and bottom dead center when the piston may tilt due to piston rockover angle.

While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A compression ring for an engine piston comprising:
   an upper face and a lower face;
   an inner face positioned between the upper and lower faces along an inner diameter of the ring, wherein the upper face, the lower face, and the inner face cooperate with an annular groove in the piston; and
   an outer face positioned between the upper and lower faces along an outer diameter of the ring for cooperation with a bore in a cylinder, the outer face formed by a smooth continuous curve along an axial direction of the ring, the curve having first and second convex surfaces connected by a concave surface;
   wherein a first radius of the first convex surface is equal to a second radius of the second convex surface; and
   wherein the concave surface has a third radius, the third radius being less than half of the first radius.

2. The compression ring of claim 1 wherein the first convex surface is blended with the concave surface and the second convex surface is blended with the concave surface to provide the curve.

3. The compression ring of claim 2 wherein the continuous, smooth curve is provided by a nonsegmented profile function.

4. The compression ring of claim 3 wherein at least a first derivative of the profile function is continuous.

5. The compression ring of claim 4 wherein at least a second derivative of the profile function is continuous.

6. The compression ring of claim 1 wherein each of the first and second convex surfaces include an arc of a circle.

7. The compression ring of claim 1 wherein the first convex surface has a tangent line aligned with the upper face.

8. The compression ring of claim 7 wherein the second convex surface has a tangent line aligned with the lower face.

9. The compression ring of claim 1 wherein the first convex surface and the concave surface share a first common tangent direction at a first joining point therebetween; and
   wherein the second convex surface and the concave surface share a second common tangent direction at a second joining point therebetween.

10. The compression ring of claim 1 wherein the first convex surface joins the upper face along a first common tangent line; and
    wherein the second convex surface joins the lower face along a second common tangent line.

11. A piston assembly for an engine comprising:
    a piston having a crown and a side forming an annular groove; and
    a compression ring received within the groove and having an outer face formed by a smooth continuous curve, the outer face having first and second convex surfaces connected by a concave surface, each convex surface having a first radius of curvature more than twice a second radius of curvature of the concave surface.

12. The piston assembly of claim 11 wherein the annular groove is adjacent to the crown such that the compression ring is a top compression ring.

13. The piston assembly of claim 11 wherein the first and second convex surfaces are adapted to contact a cylinder wall of the engine.

14. The piston assembly of claim 11 wherein an axial width of the compression ring is approximately one millimeter;
    wherein the first radius of curvature is approximately 0.25 millimeters.

15. The piston assembly of claim 11 wherein the outer face has an axial profile that is continuously differentiable.

16. The piston assembly of claim 11 wherein along the first convex surface the outer face joins an upper face of the compression ring such that a tangent line of the first convex surface is aligned with the upper face; and
    wherein along the second convex surface the outer face joins a lower face of the compression ring such that a tangent line of the second convex surface is aligned with the lower face.

17. A method of forming a piston compression ring comprising forming an outer face of the ring with a smooth continuous curve along an axial direction of the ring, the continuous curve having a first convex section and a second convex section connected by a concave section, each convex section defined by a first radius of curvature, the concave section defined by a second radius of curvature being less than half the first radius of curvature.

18. The method of claim 17 wherein the smooth continuous curve is formed such that the first convex section and the concave section share a first common tangent direction at a first joining point therebetween and the second convex section and the concave section share a second common tangent direction at a second joining point therebetween.

19. The method of claim 17 wherein forming the outer face includes profiling the outer face to correspond with a smooth nonsegmented function along the axial direction of the ring, wherein the function is continuously differentiable.

* * * * *